(12) United States Patent
Older et al.

(10) Patent No.: US 11,708,145 B2
(45) Date of Patent: Jul. 25, 2023

(54) AIRCRAFT HINGE ASSEMBLY

(71) Applicants: Airbus Operations Limited, Bristol (GB); Airbus Operations (S.A.S.), Toulouse (FR)

(72) Inventors: Russell Older, Bristol (GB); Paul Morrell, Bristol (GB); Ryan Holland, Bristol (GB); Oliver Marks, Bristol (GB); Pierre-Antoine Combes, Toulouse (FR); Guillaume De Almeida, Toulouse (FR)

(73) Assignees: AIRBUS OPERATIONS LIMITED, Bristol (GB); AIRBUS OPERATIONS (S.A.S.), Toulouse (FR)

(*) Notice: Subject to any disclaimer, the term of this patent is extended or adjusted under 35 U.S.C. 154(b) by 91 days.

(21) Appl. No.: 17/495,449

(22) Filed: Oct. 6, 2021

(65) Prior Publication Data

US 2022/0177112 A1 Jun. 9, 2022

(30) Foreign Application Priority Data

Dec. 9, 2020 (GB) ...................................... 2019390

(51) Int. Cl.
*B64C 3/56* (2006.01)
*B64C 9/02* (2006.01)

(52) U.S. Cl.
CPC . *B64C 3/56* (2013.01); *B64C 9/02* (2013.01)

(58) Field of Classification Search
CPC .. B64C 3/56; B64C 9/02; B64C 3/546; B64C 11/28; B64C 27/50
See application file for complete search history.

(56) References Cited

U.S. PATENT DOCUMENTS

| 5,323,965 | A  | * | 6/1994  | Froemming | ............. B64C 7/00 |
|-----------|----|---|---------|-----------|------------------------|
|           |    |   |         |           | 239/265.37             |
| 5,372,336 | A  |   | 12/1994 | Paez      |                        |
| 7,051,982 | B1 |   | 5/2006  | Johnson   |                        |
| 2016/0137285 | A1 |   | 5/2016 | Good et al. |                     |
| 2017/0321804 | A1 | * | 11/2017 | Soman | ................... F16J 15/027 |
| 2022/0177117 | A1 | * | 6/2022  | Older | ....................... B64C 7/00 |

FOREIGN PATENT DOCUMENTS

| CN | 108725753   | 11/2018 |
|----|-------------|---------|
| WO | 2020/239606 | 12/2020 |

OTHER PUBLICATIONS

Search Report for GB Application No. 2019390.0 dated Jun. 3, 2021, 4 pages.

* cited by examiner

*Primary Examiner* — Rodney A Bonnette
(74) *Attorney, Agent, or Firm* — Nixon & Vanderhye P.C.

(57) ABSTRACT

A hinge assembly 8a for an aircraft component including first and second hinge plates 9, 10, having an aerodynamic surface. A first seal assembly 28 to 32 is provided and arranged to seal between the aerodynamic surfaces of the hinge plates. A second seal assembly 38 to 42 is arranged to seal between the undersides of the hinge plates in order to reduce pressure leakage between voids under the hinge. The provision of two seal assemblies, each having a dedicated function, addresses the competing demands made on the sealing arrangement of an aircraft hinge assembly in use.

22 Claims, 8 Drawing Sheets

AIRCRAFT HINGE ASSEMBLY

RELATED APPLICATION

This application claims priority to and incorporates by reference United Kingdom Patent Application GB 2019390.0, filed Dec. 9, 2020.

FIELD OF TECHNOLOGY

This invention relates to a hinge assembly, such as that employed on an aircraft between, for example, the main body of a wing and a moveable wing tip device. The invention further relates to a wing having a movable wing tip device employing such a hinge assembly and to an aircraft having such a hinge assembly.

BACKGROUND

The maximum span of an aircraft wing is effectively limited by airport operating rules which govern various clearances required when maneuvering around the airport (such as the span and/or ground clearance required for gate entry and safe taxiway usage). Therefore, folding wing tip devices have been introduced into passenger aircraft, wherein a wing tip device is movable between a flight configuration for use during flight, and a ground configuration for use during ground-based operations. In the ground configuration, the wing tip device is moved away from the flight configuration such that the span of the aircraft wing is reduced, thereby allowing use of existing gates and safe taxiway usage.

The folding wing tip device is connected to a fixed wing via a hinge assembly in order to permit the wing tip device to move between the flight and ground configurations. However, when the wing tip device is in the flight configuration, any small steps, gaps or other discontinuities between the outer end of the fixed wing and the inner end of the wing tip device can create aerodynamic penalties, such as drag and pressure leakage. Therefore, it has been proposed to introduce a seal between the moving parts of the hinge assembly.

Several competing factors need to be taken into account when choosing or designing a seal for such a hinge assembly. Firstly, the seal needs to be sufficiently stiff to maintain the aerodynamic profile of the wing in the flight configuration. However, the seal also needs to be sufficiently flexible so as not to interfere with movement of the wing tip device between the flight and ground configurations. The seal must also be sufficiently resilient to be able to withstand the harsh operating environment of the aircraft.

Similar considerations apply to other moveable aircraft components forming part of the aerodynamic surface of an aircraft, for example, slats, flaps, spoilers, ailerons, elevators, rudders and air brakes.

It has been proposed to employ a barrel-type hinge assembly, with a flat rubber seal covering it. However, such a seal assembly is difficult to integrate in aircraft components having a complex surface, such as the doubly-curved surface of a wing. Furthermore, there can be circumstances where the unsupported edge of the seal is facing into the direction of airflow in use, which can disrupt the flow of air over the hinge.

BRIEF SUMMARY OF THE TECHNOLOGY

The invention provides a hinge assembly for assembly for an aircraft component, the hinge assembly comprising first and second hinge plates having an aerodynamic surface and a seal assembly comprising a first seal assembly arranged to seal between the aerodynamic surfaces of the hinge plates and a second seal assembly arranged to seal between the undersides of the plates. The provision of a second seal assembly allows for voids under the hinge plates to be sealed to reduce the likelihood of pressure leakage in use. The provision of two seal assemblies, each having a dedicated function, addresses the competing demands made on the sealing arrangement.

The seal assembly may be arranged to be flush with the aerodynamic surface of the hinge plates.

Part of each hinge plate may extend under the other, and the second seal assembly comprises a seal between the extended part of hinge plate and the underside of the other plate. Thus, the second seal assembly seals any voids under the hinge plates.

Each hinge plate may comprise a plurality of fingers, the fingers of the first and second hinge plates being interleaved, and the first seal assembly is arranged between at least some of the fingers. The provision of a hinge comprising interposed fingers allows for a hinge assembly having a complex aerodynamic profile to be made, while the sealing function is performed by the seals filling the gaps between the fingers.

The first seal assembly may comprise a plurality of finger seals attached to fingers of the hinge plates, with each finger seal being arranged to seal against a finger of the other hinge plate.

Each finger seal may have a triangular cross section and is arranged to make sealing contact with a correspondingly chamfered surface along an edge of a finger of the other hinge plate. Thus, the sealing connection between the fingers can be arranged in a predetermined orientation. For example, the sealing connection can be arranged to tilt away from an anticipated direction of oncoming air in use.

The fingers of each hinge plate may have intervening recesses, and the first seal assembly further comprises respective fingertip seals attached to at least some of the tips of the fingers and arranged to seal against the corresponding recesses of the other hinge plate. This further reinforces the seal between the hinge plates.

At least some of the fingers may have a unitary finger seal and a fingertip seal.

Each seal preferably comprises a resiliently flexible strip, which may be over moulded onto the finger or fingertip.

At least some of the fingers may be arranged to extend beneath the other hinge plate by means of finger extensions, and the second seal assembly may comprise extension seals between the finger extensions and the underside of the opposite hinge plate.

The extensions seals may have a resiliently flexible lip arranged to form a sealing contact against the underside of a hinge plate. The extension seals may be formed by overmoulding onto the respective finger extension. At least some of the fingers may have a unitary extension seal and fingertip seal.

Lugs may be attached to at least some of the fingers, the lugs being arranged to accommodate a hinge pin. The axis of the hinge may be underneath the hinge plates.

The invention may also provide a moveable aircraft component including such a hinge assembly.

The invention may further provide an aircraft wing comprising main body and wingtip device attached to the main body by means of such a hinge assembly.

BRIEF DESCRIPTION OF THE DRAWINGS

The invention will now be described, by way of example, with reference to the accompanying drawings in which:

FIG. 4b is an exploded view of the hinge plate of FIG. 4a;

FIG. 5b is an exploded view of the hinge plate of FIG. 5a; and

DETAILED DESCRIPTION OF EMBODIMENTS OF THE TECHNOLOGY

Figure 1:
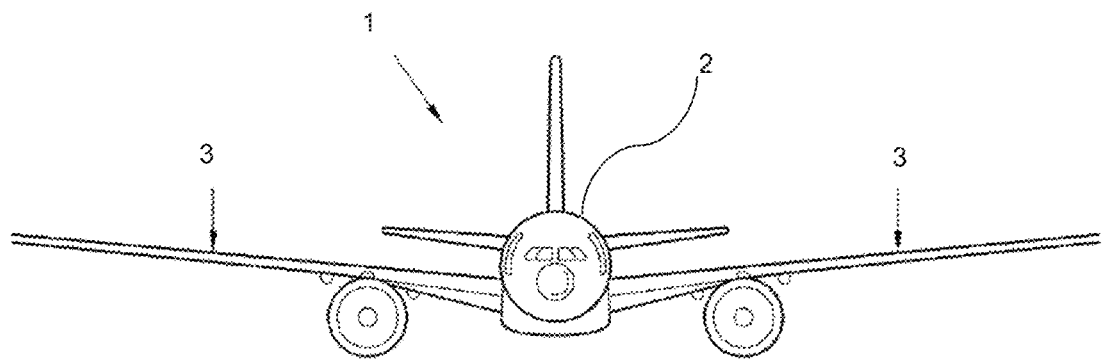
FIG. 1 is a front view of an aircraft.

With reference to FIG. 1, an aircraft indicated generally by the reference numeral 1 comprises a fuselage 2 and wings 3. The tip of one of the wings 3 on the aircraft 1 is shown in more detail in FIGS. 2a and 2b, to which reference is now made:

The wing 3 comprises a fixed wing 4 extending from the wing root at the aircraft fuselage 2, to a tip. At the tip of the fixed wing 4 there is a wing tip device 5. The wing tip device 5 is moveable from the flight configuration of FIG. 2a to a ground configuration, as shown in FIG. 2b. In the ground configuration, the wing tip device 5 is moved such that the span of the aircraft 1 is reduced (relative to the flight configuration). This enables the aircraft 1 to have a relatively large span during flight, whilst still complying with airport gate limits, safe taxiway usage etc., when on the ground.

In the flight configuration the wing tip device 5 is effectively an extension of the fixed wing 4, such that the leading edge 6' and trailing edge 7' of the wing tip device are continuations of the leading and trailing edges 6, 7 respectively of the fixed wing 4. Similarly, the upper and lower surfaces of the wing tip device 5 are continuations of the upper and lower surfaces of the fixed wing 4. The fixed wing 4 and the wing tip device 5 together form a main wing 3 on the aircraft 1.

To enable the wingtip device 5 to move with respect to the fixed wing 4, fore and aft hinge assemblies 8a, 8b are provided. The fore hinge assembly 8a supports the leading edge 6' of the wingtip device 5 and the aft hinge assembly 8b supports the trailing edge 7' of the wingtip device as it moves between the flight and ground configurations. The fore and aft hinge assemblies 8a, 8b are essentially the same and so the construction and function of one of the hinge assemblies 8a will be described here.

Figure 3A:
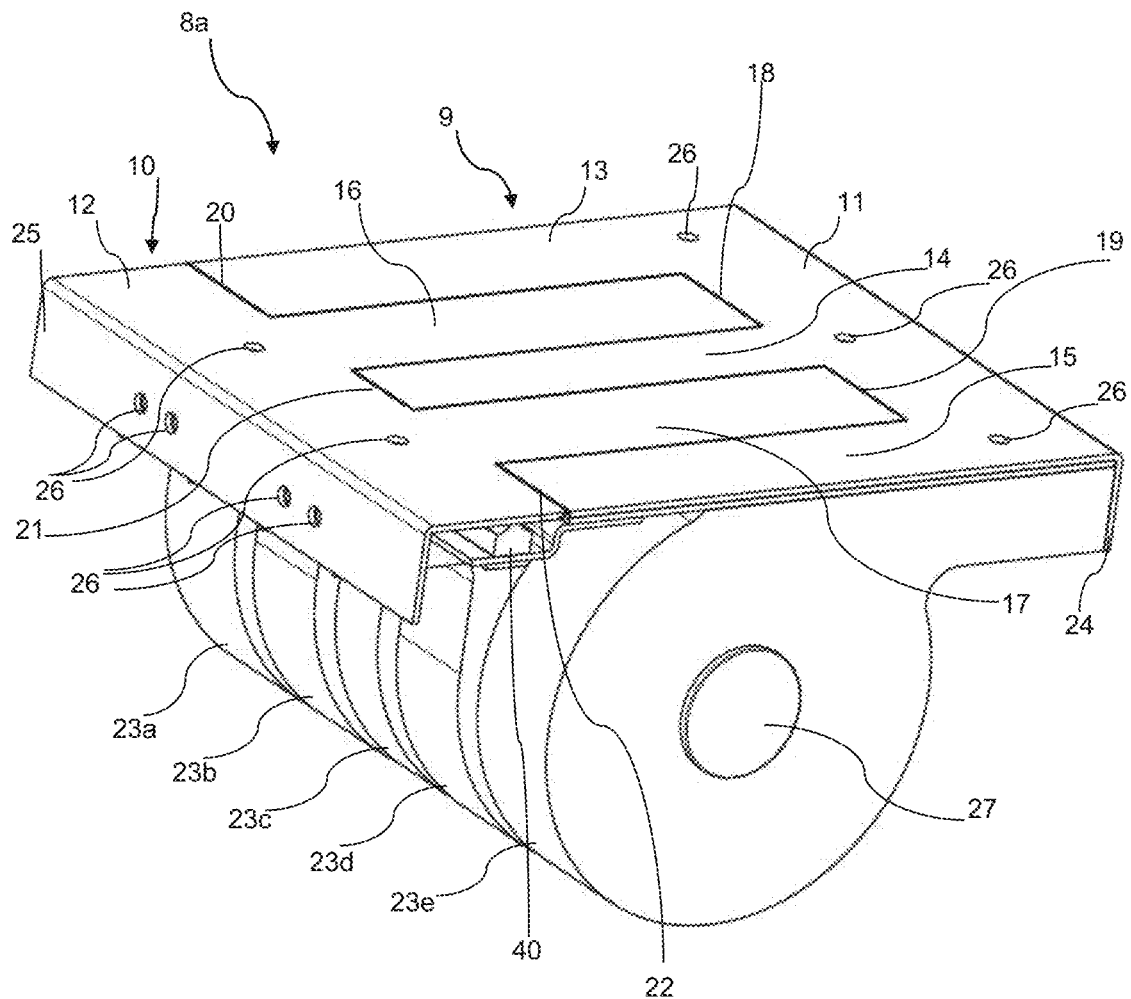
FIG. 3a is a perspective view from above of a hinge assembly constructed according to the invention in an unfolded position.

A hinge assembly 8a constructed according to the invention is shown in FIG. 3a. The hinge assembly 8a comprises two hinge plates 9, 10, one of which (9) is attached to the fixed wing 4, the other of which (10) is attached to the moveable wing tip 5. Both hinge plates 9, 10 are made of a material suitable for the operating environment of the hinge: in this example of a wing and wing tip device, suitable materials include aluminium and carbon fibre composite material. Each of the hinge plates 9, 10 comprises a main body 11, 12 respectively and a plurality of spaced fingers 13 to 17 with intervening recesses 18 to 22, so that the hinge plate has a castellated appearance.

In this example, the hinge plate 9 attached to the main wing 4 has three fingers 13 to 15 and two recesses 18, 19. The hinge plate 10 attached to the moveable wing tip device 5 has two fingers 16, 17, a central recess 21 and two recesses at the ends of the hinge plate 20, 22. The hinge plates 9, 10 may be mounted the other way around, and the hinge plates may have different numbers of fingers, in accordance with the desired configuration and application of the hinge. For clarity, the hinge plates and fingers are shown in the drawings as being flat members in a common plane however, in the application of a wing hinge, the contours of the hinge would be arranged to follow the contours of the aerodynamic surface of the wing, which is typically a doubly curved surface.

The fingers of the respective hinge plates are arranged to interleave with each other, so that the fingers 13 to 15 of the main wing hinge plate 9 alternate with the fingers 16, 17 of the wing tip device hinge plate 10. In the unfolded position of the hinge as shown in FIG. 3a, the ends of the fingers of each hinge plate abut the recesses of the other hinge plate so that fingers 13 to 15 are in the recesses 20 to 22 respectively; fingers 16 and 17 sit against recesses 18 and 19 respectively.

A plurality of hinge lugs 23a to 23e are mounted on the underside of the hinge plates 9, 10, one for each finger 13 to 17 of the hinge assembly 8a. The lugs 23a, 23c and 23e are mounted underneath the fingers 13 to 15 respectively of the main wing hinge plate 9, and lugs 23b and 23d are mounted under the fingers 16 and 17 respectively of the wing tip device hinge plate 10. Each hinge plate 9, 10 has a transverse flange 24, 25 extending downwardly from the main body 11, 12, at the opposite side of the hinge plate from the finger side. Apertures 26 in the flanges 24, 25 and in the main body 11, 12 are arranged to receive fasteners for attaching the lugs 23a to 23e to their respective hinge plates 9, 10. The lugs 23a to 23e are aligned along an axis so that their lug apertures are able to receive the hinge pin 27, which defines the rotational axis of the hinge. The lugs 23a to 23e are able to rotate about the hinge pin 27 as the hinge assembly moves between the ground and flight configurations.

Figure 2A:
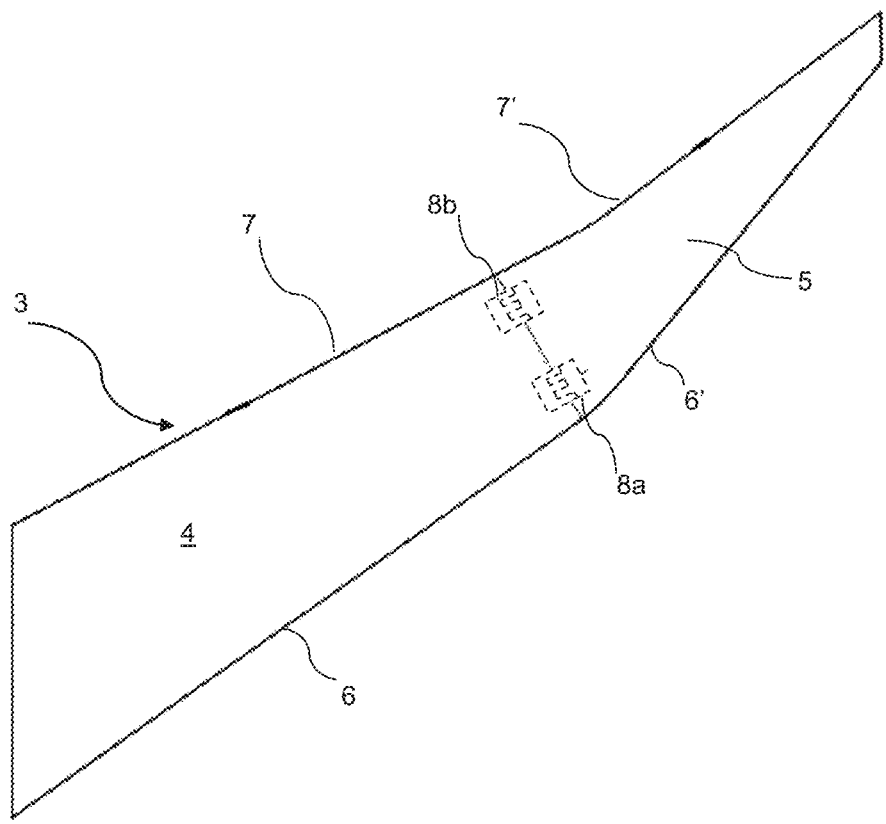
FIG. 2a shows one of the wings of the aircraft of FIG. 1, with the wing tip device in the flight configuration.
Figure 2B:
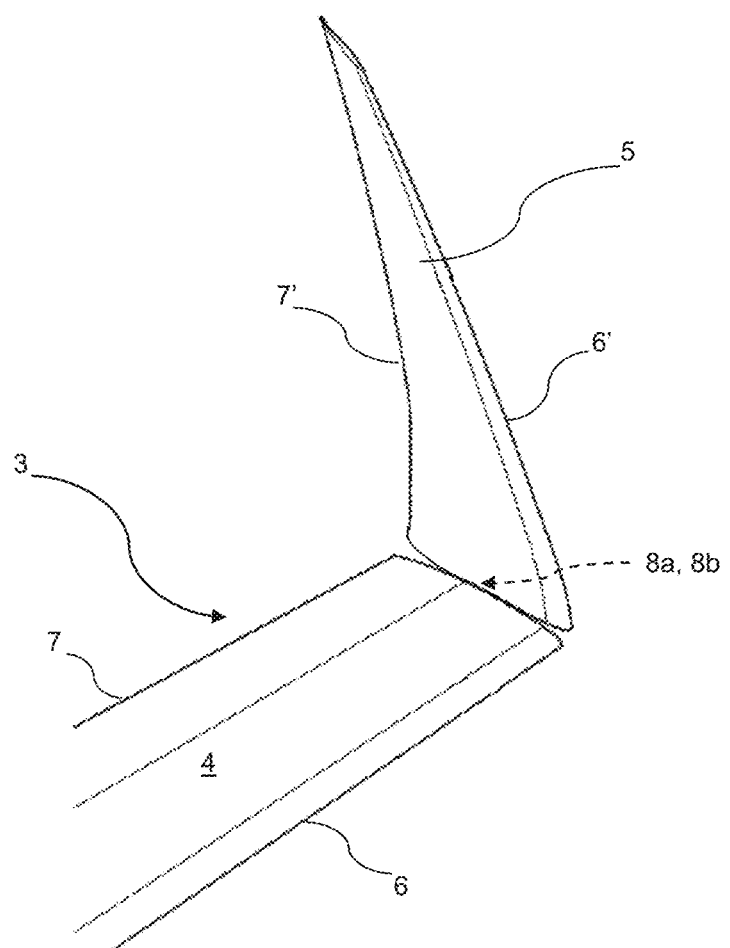
FIG. 2b shows the wing of FIG. 2a, but with the wing tip device in the ground configuration.

FIG. 3a shows the hinge assembly 8a in an unfolded position; the hinge occupies this position when the wing is in the flight configuration of FIGS. 1 and 2a. In accordance with the invention, a seal assembly is provided. A first aspect of the sealing arrangement comprises a first seal assembly for the upper aerodynamic surface of the hinge, which will now be described with reference to FIGS. 4 to 6.

Figure 4A:
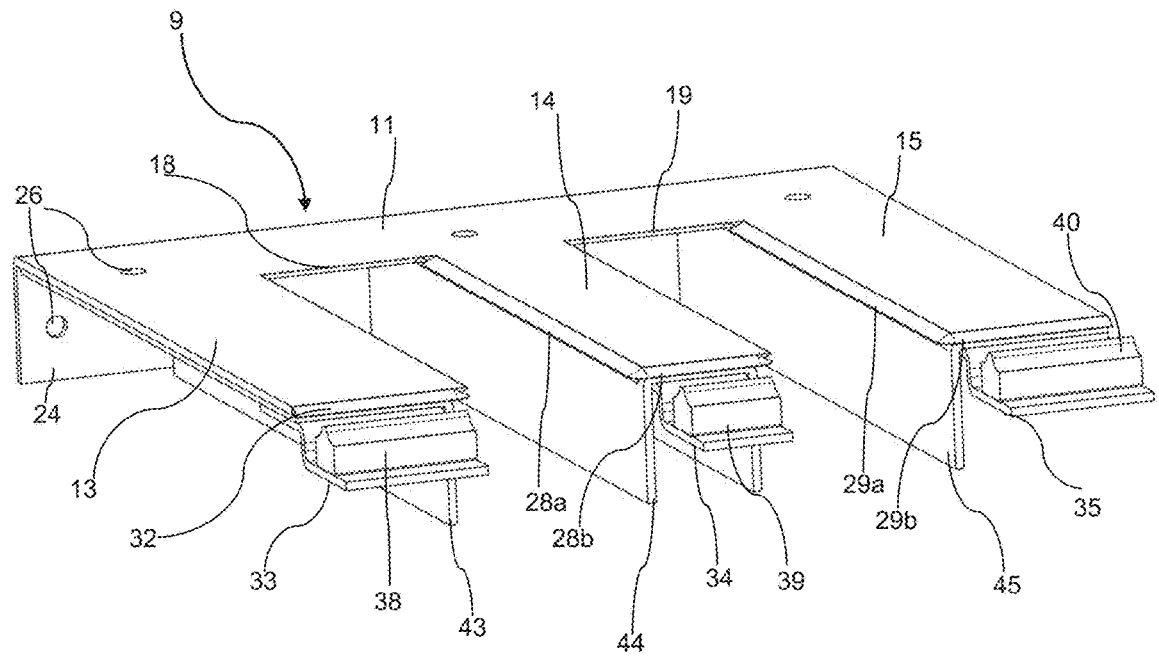
FIG. 4a is a perspective view of one of the hinge plates of FIGS. 3a to 3c.
Figure 4B:
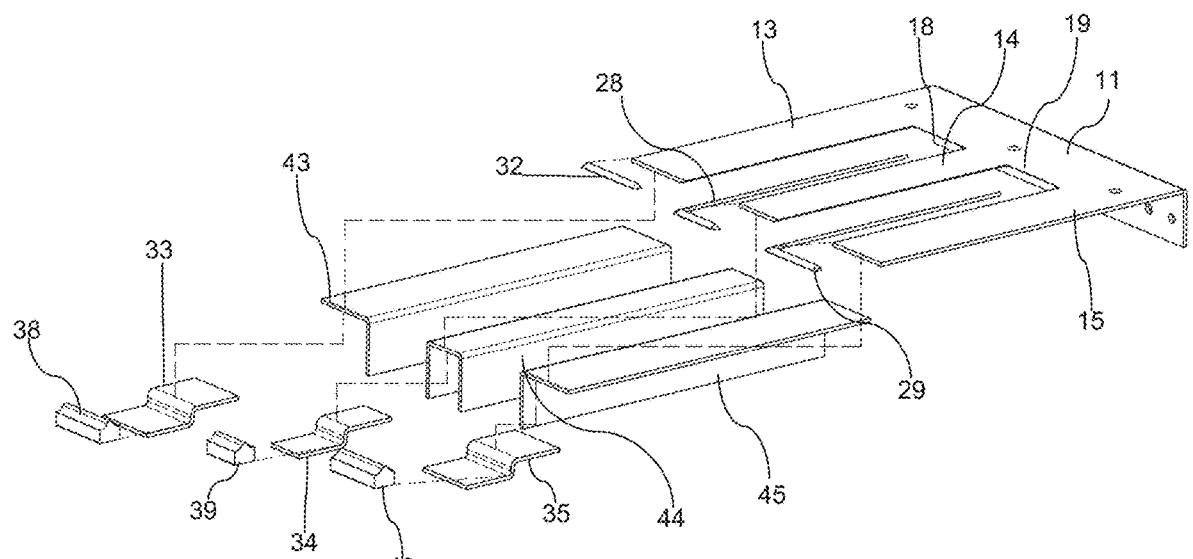
Figure 5A:
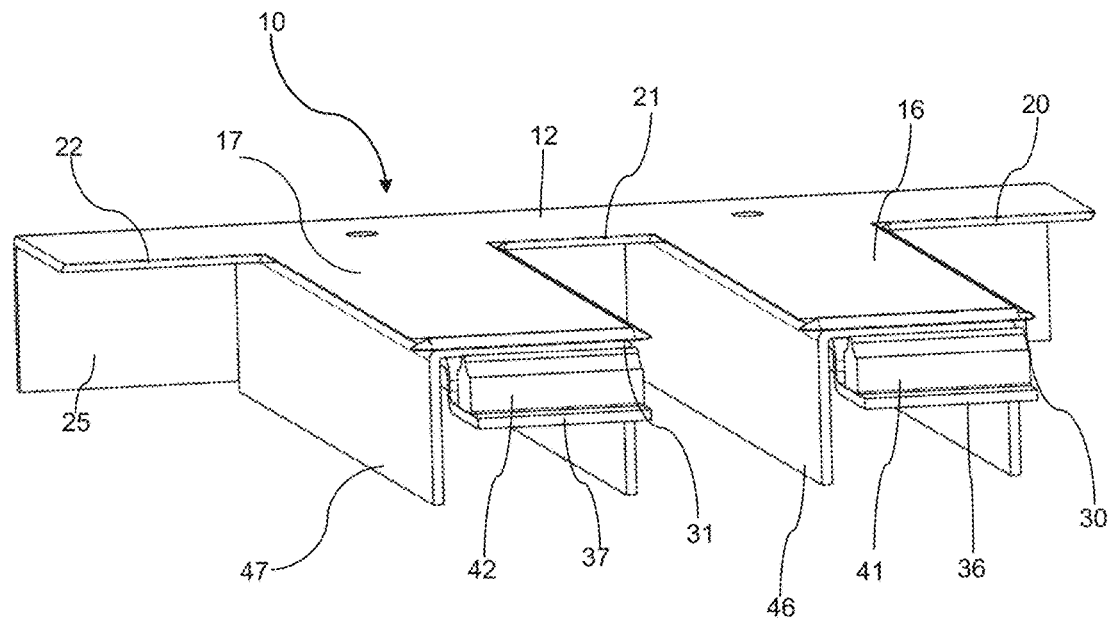
FIG. 5a is a perspective view of the other hinge plate of the hinge assembly of FIGS. 3a to 3c.
Figure 5B:
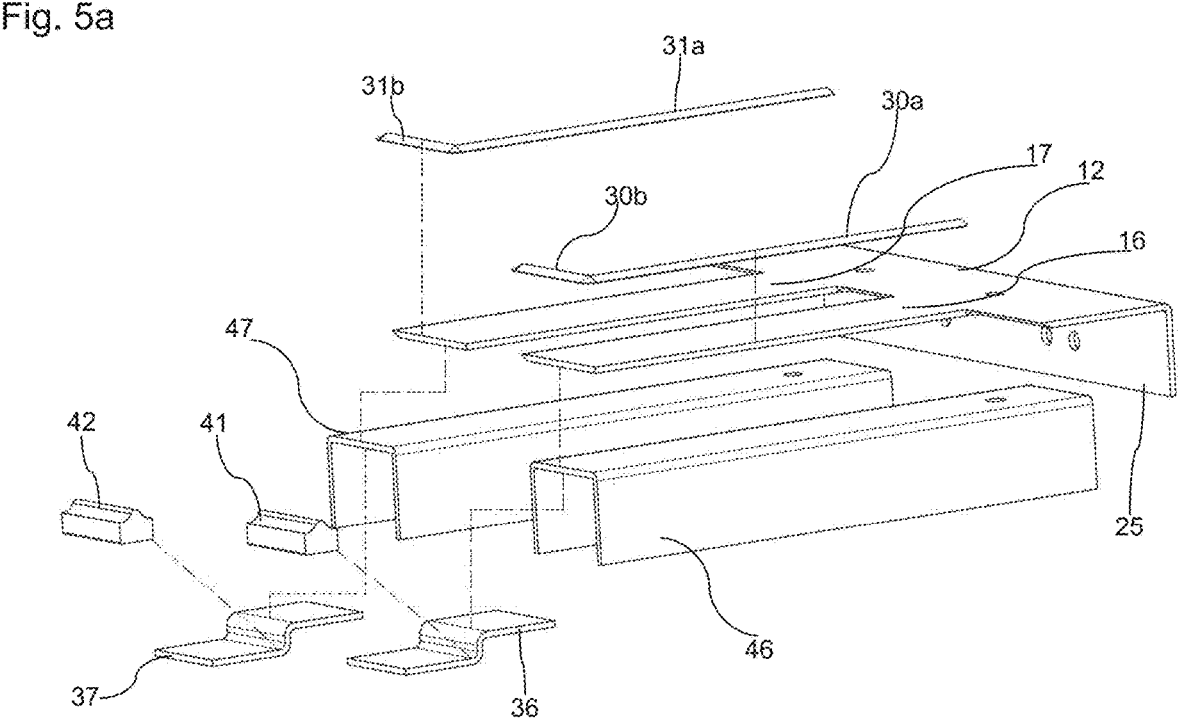
Figure 6:
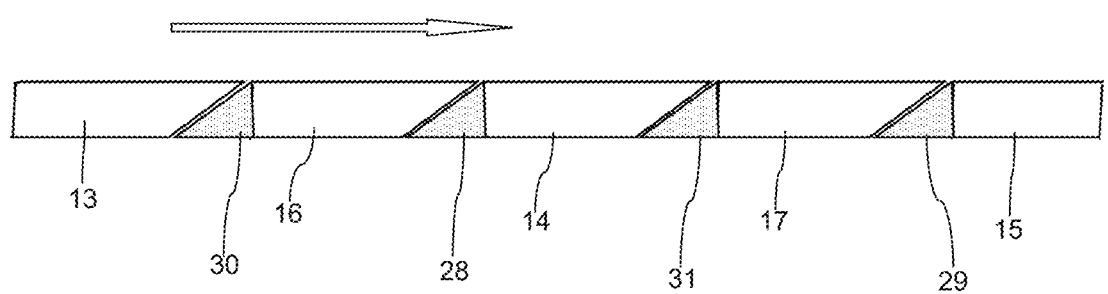
FIG. 6 is a sectional view of the hinge plates in the unfolded position of FIG. 3a, along the hinge line.

The first seal assembly comprises a plurality of elongate seal members 28 to 32 attached to the fingers 13 to 17 of the hinge plates 9, 10. Each seal member 28 to 32 comprises a resiliently flexible strip of a suitable material, such as polyurethane or silicone. The main wing hinge plate 9 has seal members 28, 29 and 32, as shown in FIGS. 4a and 4b. The wing tip device hinge plate 10 has seal members 30 and 31, as shown in FIGS. 5a and 5b. Each of the seal members 28 to 31 are L-shaped, having a first portion (a) arranged along a long edge of the finger to which it is attached, and having a second portion (b) arranged along the edge of the tip of that finger. The seal member 32 for one of the end fingers 13 of the hinge assembly needs only a seal arranged along the edge of the tip of that finger. Of course, the first and second portions of each seal member 28 to 31 could be replaced by separate seals. The seal members 28 to 32 may be attached to their respective fingers by means of a chemical bond, by mechanical fastening or by overmoulding onto the finger.

In the unfolded position of the hinge assembly, the seal members 28 to 31 are arranged so that the first portion (a) of each seal member makes sealing contact with the edge of its neighbouring finger of the other hinge plate. For example, the first portion 28a of seal member 28 which is attached to finger 14 of hinge plate 9, makes sealing contact with an edge of finger 16 of hinge plate 10. Likewise, the first portion 29a of the seal member 29 attached to finger 15 of hinge plate 9, makes sealing contact with the edge of finger 17 of hinge plate 10; seal portion 30a of finger 16 of hinge plate 10, seals against finger 13; and the seal portion 31a of finger 17 is arranged to seal against the long edge of finger 14. Thus, the seals 28 to 31 fill any gaps between the fingers 13 to 17 such that the seal assembly is substantially flush with the aerodynamic surface of the hinge plates.

Each of the seal portions 28a to 31a has a triangular cross-section. The edge of each finger 13 to 17 is arranged to have a corresponding chamfered surface so that, when in the unfolded position of FIG. 3a, each seal and its adjacent finger fit together in the manner of a scarf joint, as can be seen in the sectional view of FIG. 6. The face of each seal portion 28a to 31a and the long edge of each finger 13 to 17 are obliquely angled with respect to the plane of the hinge plates. The direction of tilt is such that each interface between a seal member and its adjacent finger faces away from the oncoming airflow that the hinge experiences during flight conditions, and towards the trailing edge of the wing 7, 7'; the arrow represents the direction of airflow. Such an arrangement provides an aerodynamic profile and a reduction in parasitic drag and noise when compared with a conventional hinge assembly.

The short portion (b) of each seal member 28 to 31, and seal member 32 also has a triangular cross section. In the unfolded position (flight configuration), each of these seal members is arranged to make sealing contact with a recess on the opposite hinge plate. For example, the seal 32 along the tip of finger 13 on hinge plate 9 is arranged to make sealing contact with recess 20 on hinge plate 10. Likewise, seal portion 28b on the tip of finger 14 seals against recess 21; seal portion 29b on finger 15 makes sealing contact with recess 22; seal portion 31b on finger 17 of the hinge plate 9 seals against the recess 19 in seal plate 10; and seal portion 30b on finger 16 seals against recess 18 on hinge plate 9. Each recess 18 to 22 has a correspondingly chamfered surface, so that the seal members at the finger tips form scarf joints with the recesses. This arrangement of seals and recesses further reinforces the seal between the hinge plates whilst maintaining the aerodynamic profile. Furthermore, the tapering surfaces between these sealing connections enables the fingers to part easily when moving from the flight configuration to the ground configuration.

As well as maintaining an aerodynamic profile between aircraft components, it is also important that the seal assembly plugs any voids or gaps between those components. It can be highly undesirable for an air path to be created between components, as high pressure uplift air may leak through to the low pressure upper surface, which will impact upon the lift performance. Therefore, a second seal assembly is provided. This second seal assembly comprises an under-seal assembly between the undersides of the hinge plates, arranged to reduce the likelihood of pressure bleed at the hinge.

Each of the fingers 13 to 17 is provided with a finger extension 33 to 37 respectively. Each finger extension 33 to 37 takes the form of a plate as wide as its finger and extending outwardly from the tip of the finger towards the opposite hinge plate. Each finger extension 33 to 37 has a slight downward dog-leg shape so that the tip of the finger extension is situated under the main body 11, 12 of the opposite hinge plate 9, 10 when the hinge is in the unfolded position. Each of the finger extensions 33 to 37 carries a seal 38 to 42 respectively, which collectively form the aforementioned second seal assembly. Each extension seal 38 to 42 is upstanding from the tip of the finger extension, and is arranged to seal against the underside of the opposite hinge plate. Therefore, extension seals 38 to 40 carried by extensions 33 to 35 respectively on the fingers 13 to 15 of hinge plate 9 are arranged to seal against the underside of main body 12 of hinge plate 10. Likewise, the extension seals 41 and 42 attached to extensions 36 and 37 of fingers 16 and 17 are arranged to make a sealing connection with the underside of hinge plate 9. Each of the extension seals 38 to 42 extends across the width of the finger extension and has a thick base, narrowing to a lip at its top end. Each lip is compressible against the underside of the hinge plate 9, 10. Together, the extension seals 38 to 42 form a sound and durable under-seal between the undersides of the hinge plates. This aspect of the sealing assembly plugs voids under the hinge plates and thereby reduces the likelihood of pressure bleed.

Each of the extension seals 38 to 42 is made of a material that is sufficiently durable to withstand the operating environment of the hinge, such as polyurethane or silicone. The extension seals 38 to 42 may be attached to their respective finger extensions 33 to 37 by any suitable attachment means, such as by bonding or overmoulding.

The hinge assembly 8a, 8b of the present invention has to be able to withstand high forces and extreme operating environments. To this end, reinforcing elements in the form of stiffeners 43 to 47 are provided. The stiffeners 43 to 47 are arranged to support the fingers 13 to 17 of the hinge plates. The stiffeners 44, 46 and 47 for fingers 14, 16 and 17 respectively are U-shaped, with the base of the U attached to the underside of its respective finger, and the walls of the U extending downwardly. The stiffeners 43 and 45 for the fingers 13 and 15 at the ends of the hinge assembly are L-shaped, with one side of the L being attached to the underside of its respective finger, and the other side extending downwardly. The stiffeners 43 to 47 may be attached to the fingers by a suitable adhesive, mechanical fasteners, or by a combination of chemical and mechanical bonding.

Figure 3B:
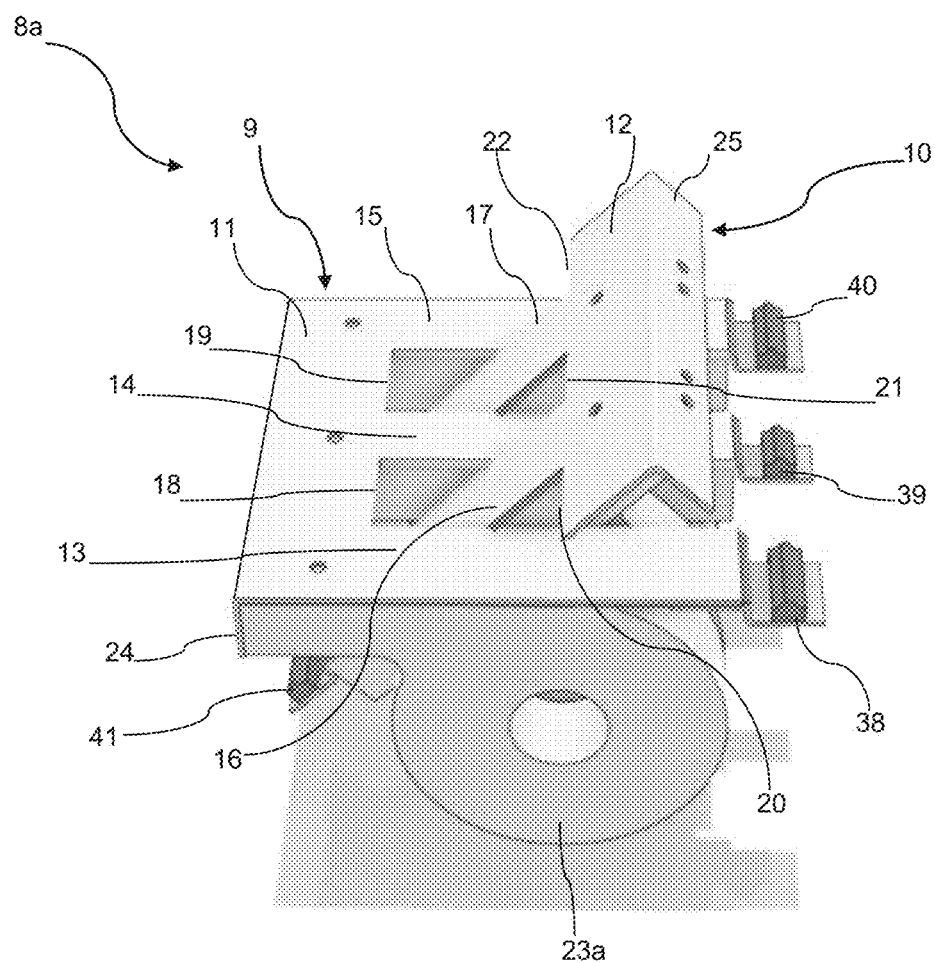
FIG. 3b is a perspective view from above of the hinge assembly of FIG. 3a in a first folded position.
Figure 3C:
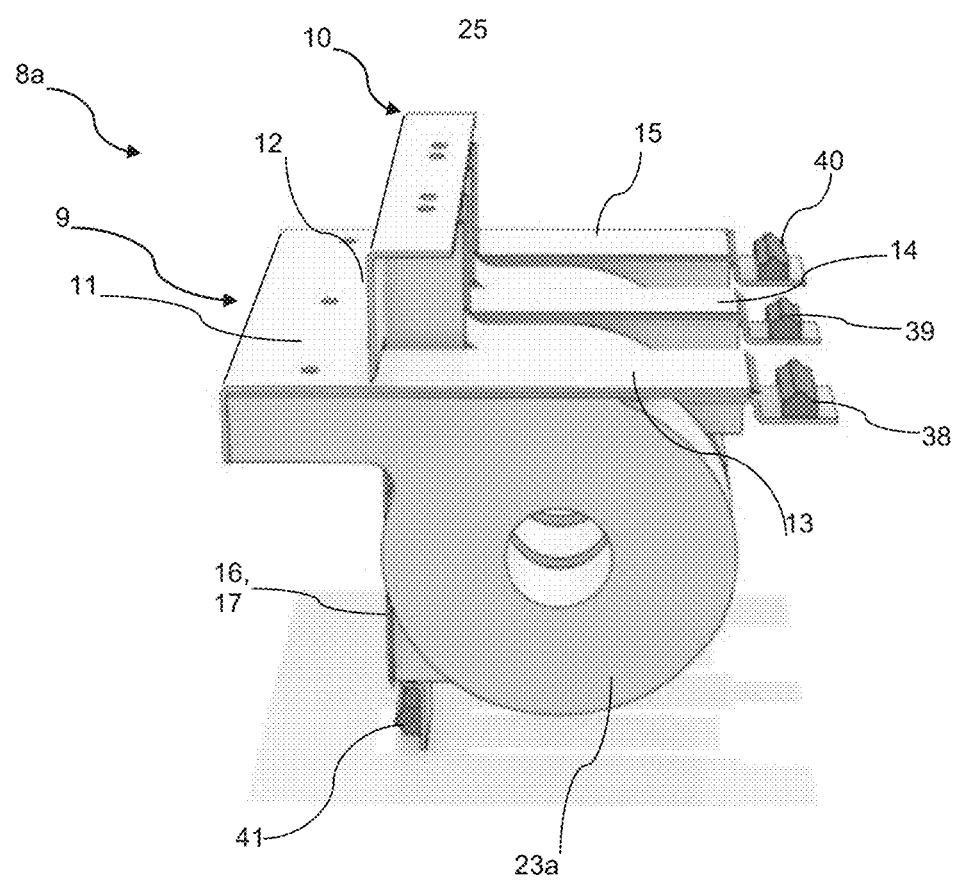
FIG. 3c is a perspective view from above of the hinge assembly of FIG. 3a in a second folded position.

FIGS. 3b and 3c show one of the hinge assemblies 8a of the present invention in action on a moveable wing. When the aircraft is moving on the ground at an airport, the pilot releases a locking mechanism to unlock the wing from its flight configuration. A wingtip folding actuator (not shown in these drawings), such as an electromechanical motor, is then automatically activated. Any suitable locking mechanism and actuator assembly may be utilised with the hinge assembly of the present invention. The actuator urges the wingtip device 5 upwards about the hinge axis. The hinge plate 10 on the wing tip device rotates with respect to hinge plate 9. FIG. 3b shows the hinge of FIG. 3a in a folded position.

In this drawing, the hinge plate 10 has moved about the hinge axis into a tilted position with respect to hinge plate 9. The seal portions 28a to 31a along the long edges of the fingers have slid away from sealing contact with their adjacent fingers. The seal portions 28b to 31b and 32 have moved away from the recesses 18 to 22. The tapering surfaces between the seals and the recesses allow the fingers to part easily from the opposite hinge plate. The main body 12 of the hinge plate 10 has moved away from the extension seals 38 to 40. Similarly, movement of the hinge plate 10 causes the extension seals 41 and 42 to move away from sealing engagement with the underside of the main body 11 of hinge plate 9.

FIG. 3c shows the position of the hinge assembly 8a when the wing tip device 5 is fully folded into the ground configuration of FIG. 2b. In this position, the hinge plates 9, 10 are almost at right angles to each other. A further locking mechanism (not shown) may be provided to maintain the wing in this position as the aircraft moves around the airport.

When the aircraft is ready for flight, the pilot again activates the actuator in order to urge the wing tip device 5 back into the flight configuration, reversing the sequence shown in FIGS. 3c and 3b until the wing is fully unfolded and the hinge assemblies occupy the position of FIG. 3a. In this position, all parts of the seal assembly resume sealing contact with their respective components and the wing is ready for flight. The seal assembly forms an aerodynamic seal between the aerodynamic surfaces of the hinge assembly and also a pressure seal between voids in the underside of the hinge assembly.

Variations may be made without departing from the scope of the invention. For example, the long portions of the finger seal members 28a to 31a may be extended downwardly over the stiffeners 44 to 47, so that the fingers of the hinge assembly remain in sealing contact with the stiffeners over a range of motion of the hinge assembly.

The seals 28b to 31b and 32 along each fingertip and the respective extension seals 38 to 42 may each be conjoined or formed of one piece. A unitary construction of each fingertip seal and its associated extension seal simplifies assembly of the sealing assembly.

In the example embodiment, the finger seals are divided equally between the hinge plates 9, 10, so that each finger carries one seal that seals against an adjacent finger. Of course, the seals could be arranged so that more or all of these seals are on one hinge plate, with fewer or none on the other.

The hinge assembly of the present invention may be used on other moveable parts of an aircraft, and is particularly suitable for flight control surfaces, such as rudders, spoilers, air brakes, slats and flaps, as the hinge assembly of the present invention can maintain the aerodynamic profile and reduce pressure bleed for each of these moveable components. Further variations will be apparent to the skilled person.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A hinge assembly for an aircraft component, the hinge assembly comprising:
   first and second hinge plates each having an aerodynamic surface; and
   a seal assembly including:
      a first seal between the aerodynamic surface of the first hinge plate and the aerodynamic surface of the second hinge plate, and
      a second seal between an underside of the first hinge plate and an underside of the second hinge plate.

2. The hinge assembly as claimed in claim 1, in which the first seal is flush with the aerodynamic surface of at least one of the first and second hinge plates.

3. The hinge assembly as claimed in claim 1, further comprising:
   a first extended part of the first hinge plate extending under the second hinge plate; and
   a second extended part of the second hinge plates extending under the first hinge plate,
   wherein the second seal includes a first seal element between the first extended part of first hinge plate and the underside of the second hinge plate.

4. The hinge assembly as claimed in claim 1, in which each of the first and second hinge plates comprises a plurality of fingers, the fingers of the first hinge plate interleave with the fingers of the second hinge plate,
   wherein the first seal is between a finger of the first hinge plate and a finger of the second hinge plate.

5. The hinge assembly as claimed in claim 4, in which the first seal comprises:
   a finger seal attached to a respective one of the fingers of the first hinge plate, wherein the finger seal is sandwiched between the respective one of the fingers and one of the fingers on the second hinge plate.

6. The hinge assembly as claimed in claim 5, in which the finger seals each have a triangular cross section, and is arranged to make sealing contact with a chamfered surface along an edge of one of the fingers adjacent the respective one of the fingers having the finger seal.

7. The hinge assembly as claimed in claim 5, in which the finger seal comprises a resiliently flexible strip.

8. The hinge assembly as claimed in claim 5, in which the finger seal is over-moulded onto one of the fingers.

9. The hinge assembly as claimed in claim 4, further comprising:
   at least one recess between the fingers on each of the first or second hinge plate, and
   the first seal includes a fingertip seal attached to a tip region of one of the fingers in the first hinge plate, and the fingertip seal is sandwiched between the finger to which the finger seal is attached and an apex of one of the recesses in the second hinge plate.

10. The hinge assembly as claimed in claim 9, in which a plurality of the fingers each includes the first seal, and the first seal on each of the plurality of the fingers is a unitary, single piece seal including the fingertip seal and the finger seal.

11. The hinge assembly as claimed in claim 4, further comprising:
    a finger extension on at least one of the fingers of the first hinge plate, wherein the extension extends beneath the second hinge plate, and
    the second seal includes an extension seal on the finger extension, wherein the extension seal is sandwiched between the finger extension and the underside of the second hinge plate.

12. The hinge assembly as claimed in claim 11, in which the extension seal includes a resiliently flexible lip.

13. The hinge assembly as claimed in claim 11, in which the extension seal is over-moulded onto the finger extension.

14. The hinge assembly as claimed in claim 11, in which the extension seal is aligned with a tip of the finger having the extension and the finger extension.

15. The hinge assembly as claimed in claim 4, further comprising a lug attached to at least some of the fingers, wherein each the lugs is configured to accommodate a hinge pin.

16. The hinge assembly as claimed in claim 15, in which a rotational axis about which one of the first and second hinge plate rotates is underneath the first and second hinge plates.

17. A moveable aircraft component including the hinge assembly of claim 1.

18. An aircraft wing comprising a main body and wingtip device attached to the main body by the hinge assembly as claimed in claim 1.

19. An aircraft including the aircraft wing as claimed in claim 18.

20. The aircraft as claimed in claim 19, in which the hinge plates are arranged to form sealing connections tilted away from a direction of incoming air when the aircraft is in flight.

21. An aircraft including a moveable component having the hinge assembly in claim 1.

22. An aircraft wing comprising:
a fixed wing including a tip;
a wing tip device including and end;
a first hinge assembly configured to attached the wing tip device to the fixed wing to allow the wing tip device to pivot with respect to the fixed wing, wherein the first hinge assembly includes:
the first hinge assembly attached to the tip of the fixed wing, wherein the first hinge assembly includes:
a first hinge plate with fingers each having an outer aerodynamic surface;
first seals each mounted to a side edge of each of a respective one of the fingers of the first hinge plate, wherein each of the first seals extends a length of the respective finger and is flush with the aerodynamic surface of the respective finger;
finger extensions each extending outward from a respective one of the fingers, wherein the finger extension is offset inward of the fixed wing from the aerodynamic surface of the respective finger,
second seals each mounted to a respective one of the finger extensions;
recesses between the fingers, and
lugs wherein each of the fingers is mounted onto a respective one of the lugs; and
a second hinge assembly attached to the end of the wing tip device,
wherein the second hinge assembly includes:
a second hinge plate with fingers each having an outer aerodynamic surface, wherein at the fingers of the second hinge plate interleave with the fingers of the first hinge plate such that at least one of the fingers of the second hinge plate is positioned in a recess of the first hinge plate,
first seals each mounted to a side edge a respective one of the fingers of the second hinge plate, wherein each of the first seals extends a length of the respective finger, is flush with the aerodynamic surface of the respective finger, and is configured to be sandwiched between the respective finger of the second hinge plate and one of the fingers of the first hinge plate;
finger extensions each extending from an end of a respective finger of the second hinge plate, wherein the finger extension of the second hinge plate are each offset inward of the wing tip device from the aerodynamic surface of the respective finger of the second hinge plate, and
second seals each mounted to a respective one of the finger extensions of the second hinge plate, wherein the second seal is configured to be sandwiched between the finger extension of the second hinge plate to which the second seal is mounted and an underside of the first hinge plate; and
lugs wherein each of the fingers of the second hinge plate is mounted onto a respective one of the lugs.

* * * * *